United States Patent [19]

Kuroda et al.

[11] Patent Number: 5,213,925
[45] Date of Patent: May 25, 1993

[54] PHOTOCONDUCTOR FOR ELECTROPHOTOGRAPHY

[75] Inventors: Masami Kuroda; Masayo Amano; Noboru Furusho, all of Kawasaki, Japan

[73] Assignee: Fuji Electric Co., Ltd., Kawasaki, Japan

[21] Appl. No.: 793,723

[22] Filed: Nov. 20, 1991

[30] Foreign Application Priority Data

Nov. 22, 1990 [JP] Japan .................. 2-318299

[51] Int. Cl.$^5$ .................. G03G 5/09; G03G 5/047
[52] U.S. Cl. .................. 430/59; 430/83
[58] Field of Search .................. 430/54, 75, 83

[56] References Cited

U.S. PATENT DOCUMENTS

| | | | |
|---|---|---|---|
| 4,702,983 | 10/1987 | Haino et al. | 430/75 |
| 4,731,315 | 3/1988 | Horie et al. | 430/77 |
| 4,783,387 | 11/1988 | Ueda | 430/76 |
| 4,808,503 | 2/1989 | Yamada et al. | 430/75 |
| 4,839,252 | 6/1989 | Murata et al. | 430/59 |
| 4,861,691 | 8/1989 | Kuroda et al. | 430/59 |
| 4,861,692 | 8/1989 | Kuroda et al. | 430/59 |
| 4,865,934 | 9/1989 | Ueda et al. | 430/59 |
| 4,871,636 | 10/1989 | Hattori et al. | 430/77 |
| 4,882,255 | 11/1989 | Hattori et al. | 430/73 |
| 4,935,323 | 6/1990 | Hattori et al. | 430/58 |
| 4,985,325 | 1/1991 | Kuroda et al. | 430/59 |
| 5,080,991 | 1/1992 | Ono et al. | 430/75 X |

FOREIGN PATENT DOCUMENTS

| | | |
|---|---|---|
| 131146 | 6/1988 | Japan . |
| 157160 | 6/1988 | Japan .................. 430/59 |
| 567 | 1/1989 | Japan . |
| 49049 | 2/1989 | Japan .................. 430/75 |
| 164950 | 6/1989 | Japan .................. 430/75 |
| 185637 | 7/1989 | Japan . |
| 234856 | 9/1989 | Japan . |
| 79855 | 3/1990 | Japan .................. 430/75 |
| 2760 | 1/1991 | Japan .................. 430/59 |
| 94263 | 4/1991 | Japan .................. 430/59 |

Primary Examiner—Roland Martin
Attorney, Agent, or Firm—Spencer, Frank & Schneider

[57] ABSTRACT

A photoconductor for electrophotography comprises an electroconductive substrate; and a photosensitive layer formed on the electroconductive substrate. The photosensitive layer includes a charge generating substance and a charge transporting substance including at least one hydrazone compound represented by general formula (I):

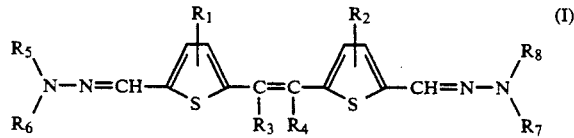

wherein each of $R_1$, $R_2$, $R_3$ and $R_4$ is selected from the group consisting of a hydrogen atom, a halogen atom, an alkyl group and an aryl group, and each of $R_5$, $R_6$, $R_7$ and $R_8$ is selected from the group consisting of an alkyl group, and a substituted or unsubstituted aryl group, aralkyl group and heterocyclic group.

8 Claims, 1 Drawing Sheet

PHOTOCONDUCTOR FOR ELECTROPHOTOGRAPHY

BACKGROUND OF THE INVENTION

1. Field of the Invention

The present invention relates to a photoconductor for electrophotography, and more particularly to a photoconductor for electrophotography with a high sensitivity and excellent characteristics in repeated use.

2. Description of the Prior Art

Photosensitive materials which have heretofore been used in photoconductors for electrophotography include inorganic photoconductive substances such as selenim and selenium alloys, dispersions of inorganic photoconductive substances such as zinc oxide and cadmium sulfide in resin binders, organic polymeric photocoductive substances such as poly-N-vinylcarbazole and polyvinylanthracene, organic photoconductive substances such as phthalocyanine compounds and bisazo compounds, and dispersions of such organic polymeric photoconductive substances in resin binders, and vacuum evaporated film of such organic polymeric photoconductive substances.

Photoconductors are required to have a function of maintaining a surface electric charge in the dark, a function of generating an electric charge upon receiving light, and a function of transporting an electric charge upon receiving light. They are classified into two types of photoconductors, namely so-called monolayer type photoconductors, and so-called laminate type photoconductors. The former comprises a single layer having all of the abovementioned three functions, and the latter comprises functionally distinguishable laminated layers, one of which contributes mainly to the generation of electric charge, and another of which contributes to the retention of surface electric charge in the dark and the transportation of electric charge upon receiving light.

In an electrophotographic method using a photoconductor of the kind as mentioned above, for example, the Carlson's system is applied to image formation. The image formation according to this system comprises steps of subjecting a photoconductor in the dark to corona discharge to charge the photoconductor, illuminating the surface of the charged photoconductor with imagewise light based on a manuscript or copy bearing, e.g., letters and/or pictures to form a latent electrostatic image, developing the formed latent electrostatic image with a toner, and transferring the developed toner image to a support such as a paper sheet to fix the toner image on the support. After the toner image transfer, the photoconductor is subjected to the steps of removal of the electric charge, removal of the remaining toner (cleaning), neutralization of the residual charge with light (erasion), and so on to be ready for reuse.

Photoconductors for electrophotography in which use is made of a photosensitive organic compound have recently been put into practical use by virtue of the advantageous features such as flexibility, thermal stability and/or a film forming capacity. A variety of charge transporting substances are known, for example, an oxadiazole compound is disclosed in U.S. Pat. No. 3,189,447, a pyrazoline compound is disclosed in Japanese Patent Application Publication No. 2,023/1984, a hydrazone compund is disclosed in Japanese Patent Application Publication No. 42,380/1979 and Japanese Patent Application Laying-open No. 101,844/1982, a triallylamine is disclosed in Japanese Patent Application Laying-Open No. 32,327/1983 and a stilbene compound is disclosed in Japanese Patent Application Laying-open No. 198,043/1983.

Although organic materials have a number of advantageous features mentioned above with which inorganic materials are not endowed, however, the fact is that there have been obtained no organic materials fully satisfying all the characteristics required of a material to be used in photoconductors for electrophotography at the present. Particular problems involved in organic materials have been concerned with photosensitivity and characteristics in continuous repeated use.

SUMMARY OF THE INVENTION

An object of the present invention is to provide a photoconductor for electrophotography to be used in copying apparatuses and printers which photoconductor has a high photosensitivity and excellent characteristics in repeated use, through the use, in the photosensitive layer, of a novel organic materials not used to date as a charge transporting substance.

In the first aspect of the present invention, a photoconductor for electrophotography comprises:
an electroconductive substrate; and
a photosensitive layer formed on the electroconductive substrate including at least one of the hydrazone compounds represented by the following general formula (I) as a charge transporting substance:

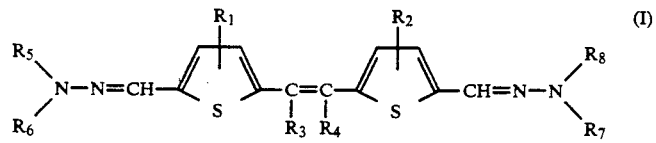

wherein each of $R_1$, $R_2$, $R_3$ and $R_4$ is selected from the group consisting of a hydrogen atom, a halogen atom, an alkyl group and an aryl group, and each of $R_5$, $R_6$, $R_7$ and $R_8$ is selected from the group consisting of an alkyl group, and a substituted or unsubstituted aryl group, aralkyl group and heterocyclic group.

Here, each of $R_1$, $R_2$, $R_3$ and $R_4$ may be a hydrogen atom and each of $R_5$, $R_6$, $R_7$ and $R_8$ may be a phenyl group.

Each of $R_1$, $R_2$ may be a hydrogen atom, each of $R_3$, $R_4$ may be a methyl group and each of $R_5$, $R_6$, $R_7$ and $R_8$ may be a phenyl group.

Each of $R_1$, $R_2$, $R_3$ and $R_4$ may be a hydrogen atom, each of $R_5$ and $R_8$ may be a phenyl group and each of $R_6$ and $R_7$ may be a methyl group.

Each of $R_1$, $R_2$, $R_3$ and $R_4$ may be a hydrogen atom, each of $R_5$ and $R_8$ may be a phenyl group and each of $R_6$ and $R_7$ may be an ethyl group.

Here, the photosensitive layer may comprise a laminate of a charge generating layer including a charge generating substance and a charge transporting layer including the charge transporting substance, and the charge transporting layer may include the charge transporting substance dispersed in resin binder and the ratio of the charge transporting substance to the resin binder is within the range from 30 to 80 per cent by weight.

The photosensitive layer may include a dispersion of a charge generating substance and a charge transporting substance in a resin binder.

In the second aspect of the present invention, a photoconductor for electrophotography comprises:

an electroconductive substrate; and a photosensitive layer formed on the electroconductive substrate including at least one of the hydrazone compounds represented by the following general formula (II) as a charge transporting substrate:

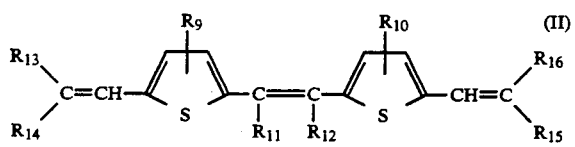
(II)

wherein each of $R_9$, $R_{10}$, $R_{11}$ and $R_{12}$ is selected from the group consisting of a hydrogen atom, a halogen atom, an alkyl group and an aryl group, and each of $R_{13}$, $R_{14}$, $R_{15}$ and $R_{16}$ is selected from the group consisting of a hydrogen atom, a halogen atom, an alkyl group, and a substituted or unsubstituted aryl group and heterocyclic group.

Here, each of $R_9$, $R_{10}$, $R_{11}$ and $R_{12}$ may be a hydrogen atom, each of $R_{13}$ and $R_{14}$ may be a phenyl group and each of $R_{15}$ and $R_{16}$ may be a phenyl group substituted with a methyl group.

Each of $R_9$, $R_{10}$, $R_{11}$ and $R_{12}$ may be a hydrogen atom, each of $R_{13}$ and $R_{16}$ may be a phenyl group and each of $R_{14}$ and $R_{15}$ may be a methyl group.

Each of $R_9$, $R_{10}$, $R_{11}$ and $R_{12}$ may be a hydrogen atom, each of $R_{13}$ and $R_{16}$ may be a phenyl group and each of $R_{14}$ and $R_{15}$ may be an ethyl group.

Here, the photosensitive layer may comprise a laminate of a charge generating layer including a charge generating substance and a charge transporting layer including the charge transporting substance.

The charge transporting layer may comprise a layer including a charge transporting substance dispersed in resin binder and the ratio of the charge transporting substance to the resin binder is within the range from 30 to 80 per cent by weight, and the photosensitive layer may include a dispersion of a charge generating substance and a charge transporting substance in a resin binder.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

Figure 1:
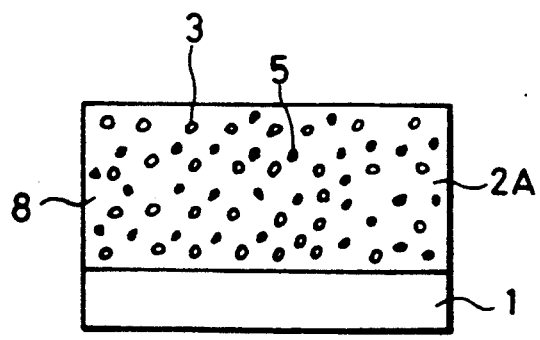
FIGS. 1 to 3 are schematic cross-sectional views of photoconductors according to the present invention.
Figure 2:
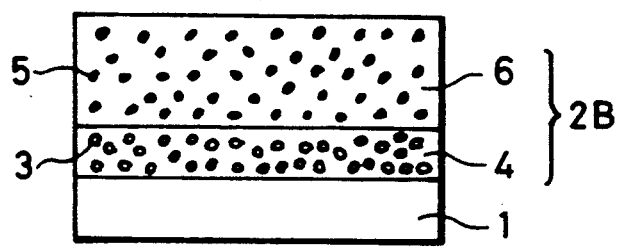
Figure 3:
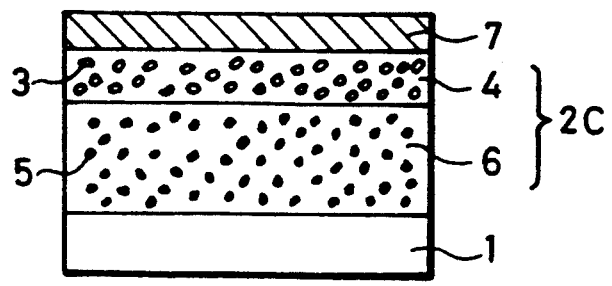

The photoconductor according to the present invention which contains a hydrazone compound in the photosensitive layer thereof may be in the form of any one of the structures of FIGS. 1, 2 and 3, depending on the way of application of the hydrazone compound.

FIGS. 1, 2 and 3 are schematic cross-sectional views of different embodiments of the photoconductor according to the present invention, respectively.

FIG. 1 shows a monolayer type photoconductor. A photosensitive layer 2A is provided on an electroconductive substrate 1. The photosensitive layer 2A comprises a charge generating substance 3 and a hydrazone compound as a charge transporting substance 5, both of which substances are dispersed in a resin binder 8.

FIG. 2 shows a laminate type photoconductor. A laminated photosensitive layer 2B is provided on an electroconductive substrate 1, a lower layer of the laminate is a charge generating layer 4 including a charge generating substance 3 as a main component and an upper one is a charge transporting layer 6 containing a hydrazone compound as a charge transporting substance 5. It is possible to provide a covering layer 7 on the laminated photosensitive layer 2B according to cases.

FIG. 3 shows another laminate type photoconductor having a layer structure in reverse to that of FIG. 2. A laminated photosensitive layer 2C is provided on an electroconductive substrate 1, a lower layer of the laminate is a charge transporting layer 6 including a hydrazone compound as a charge transporting substance 5 and an upper one is a charge generating layer 4 including a charge generating substance 3. In this case, a covering layer 7 may generally be further provided as shown in FIG. 3 to protect the charge generating layer 4.

Thus, there are two different types of layer structures in the photoconductor as shown in FIG. 2 and FIG. 3. The reason for this is that, even if any photoconductor with the layer structure as shown in FIG. 2 is to be used in the positive charge mode, no charge transporting substances adaptable to the positive charge mode have been found yet. Accordingly, when the positive charge mode is adapted, the photoconductor is required of a layer structure as shown in FIG. 3 at present.

A photoconductor as shown in FIG. 1 can be produced by dispersing a charge generating substance in a solution of a charge transporting substance and a resin binder and applying the resulting dispersion onto an electroconductive substrate.

A photoconductor as shown in FIG. 2 can be prepared by depositing a charge generating substance on an electroconductive substrate by means of vacuum evaporation or applying and drying a dispersion of a particulate charge generating substance in a solvent and/or a resin binder on an electroconductive substrate, followed by applying a solution of a charge transporting substance and a resin binder on the resulting layer and drying.

A photoconductor as shown in FIG. 3 can be prepared by applying and drying a solution of a charge transporting substance and a resin binder on an electroconductive substrate, and depositing a charge generating substance on the resulting coating layer by means of vacuum evaporation or coating and drying a dispersion of a particulate charge generating substance in a solvent and/or a resin binder on the coating layer, followed by formation of a covering layer.

The electroconductive substrate 1 serves as an electrode of the photoconductor and as a support for a layer(s) formed thereon. The electroconductive substrate may be in the form of a cylinder, a plate or a film, and may be made of a metallic material such as aluminum, stainless steel or nickel, or other material having a surface treated to be electroconductive, such as glass so treated or a resin so treated.

The charge generating layer 4 is formed by application of a dispersion of a particulate charge generating substance 3 in a resin binder or by deposition of a charge generating substance by means of vacuum evaporation, or the like technique as described above, and this layer generates an electric charge upon receiving light. It is important that the charge generating layer 4 be high not only in charge generating efficiency but also in capability of injecting the generated electric charge into the charge transporting layer 6 and any covering layer 7, whose capability is desirably as little dependent upon the electric field as possible and high even in low intensity electric fields. Usable charge generating substances include phthalocyanine compounds such as metal-free phthalocyanine and titanyl phthalocyanine; various azo, quinone and indigo pigments; dyes such as cyanine, squarylium, azulenium, and pyrylium compounds; and selenium and selenium compounds. Among them, a suitable compound can be chosen depending on the wavelength range of a light source used for the image formation. The thickness of the charge generating layer is determined depending on the extinction coefficient of a charge generating substance to be used therein in view of the layer's function of generating an electric charge, but is generally 5 μm or smaller, preferably 1 μm or smaller. It is also is possible to form a charge generating layer using a charge generating substance as a main component in mixture with a charge transporting substance and so on. Resin binders usable in the charge generating layer include polycarbonates, polyesters, polyamides, polyurethanes, polyvinyl chloride, epoxy resins, diallylphthalate resins, silicone resins, and methacrylate homopolymer and copolymers, which may be used either alone or in an appropriate composition ratio.

The charge transporting layer 6 is a coating film containing a hydrazone compound as an organic charge transporting substance in a resin binder. The charge transporting layer serves as an insulator layer in the dark so as to retain the electric charge of the photoconductor, and fulfills a function of transporting an electric charge injected from the charge generating layer upon receiving light. Resin binders usable in the charge transporting layer include polycarbonates, polyesters and methacryate homopolymer and copolymers.

The ratio of the compound represented by the aforementioned general formula (I) or (II) to the resin binder is within the range from 30 to 80 percent by weight, preferably from 40 to 60 percent by weight. Usable solvents include chloroform, dichloromethane, benzene, toluene, methylethylketone, tetrahydrofuran and so on.

The covering layer 7 has a function of receiving and retaining an electric charge generated by corona discharge in the dark and a capability of transmitting light to which the charge generating layer should respond. It is necessary that the covering layer transmits light upon exposure of the photoconductor and allows the light to reach the charge generating layer, and then undergoes the injection of an electric charge generated in the charge generating layer to neutralize and erases a surface electric charge. Materials usable in the covering layer include organic insulating film-forming materials such as polyesters and polyamides. Such organic materials may also be used in mixture with an inorganic material such as a glass resin or $SiO_2$, or a material for lowering electric resistance such as a metal or a metallic oxide. Materials usable in the covering layer are not limited to organic insulating materials for film-forming, and further include inorganic materials such as $SiO_2$, metals, and metallic oxides, which may be formed into a covering layer by an appropriate method such as evaporation or sputtering. From the viewpoint of the aforementioned description, it is desirable that the material to be used in the covering layer be as transparent as possible in the wavelength range in which the charge generating substance attains maximum light absorption.

Although the thickness of the covering layer depends on the material or composition thereof, it can be arbitrarily set in so far as it does not produce any adverse effects including an increase in a residual potential in continuous repeated use.

The hydrazone compounds to be used in the present invention can be easily synthesized by a customary method.

The first group of hydrazone compounds is represented by the following general formula (I).

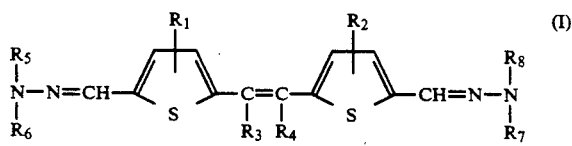

Wherein, each of $R_1$, $R_2$, $R_3$ and $R_4$ is selected from the group consisting of a hydrogen atom, a halogen atom, an alkyl group or an aryl group, and each of $R_5$, $R_6$, $R_7$ and $R_8$ is a substituted or unsubstituted aryl group, aralkyl group or heterocyclic group.

These compounds are synthesized by dehydration-condensating an aldehyde of the formula:

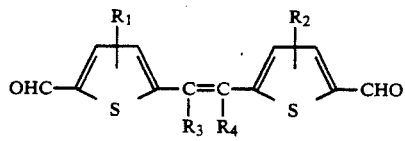

with a hydrazine compound of the formula:

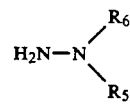

in an appropriate organic solvent such as an alcohol.

The second group of the hydrazone compounds is represented by the following general formula (II):

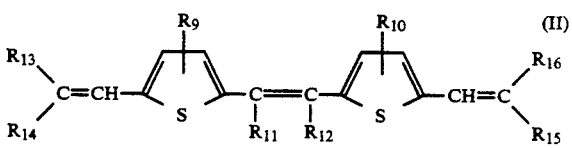

Wherein, each of $R_9$, $R_{10}$, $R_{11}$ and $R_{12}$ is selected from the group consisting of a hydrogen atom, a halogen atom, an alkyl group and an aryl group, and each of $R_{13}$, $R_{14}$, $R_{15}$ and $R_{16}$ is selected from the group consisting of a hydrogen atom, a halogen atom, an alkyl group, a substituted or unsubstituted aryl group or heterocyclic group.

These compounds represented by the general formula (II) are synthesized by reacting an aldehyde of the formula:
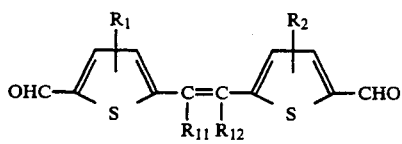
with a Wittig reagent of the formula:
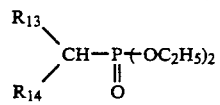
or
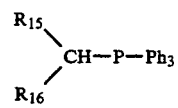
according to the Wittig reaction.
Specific examples of the hydrazone compounds of the general formula (I) prepared in the above-mentioned manner include:
COMPOUND No I-1
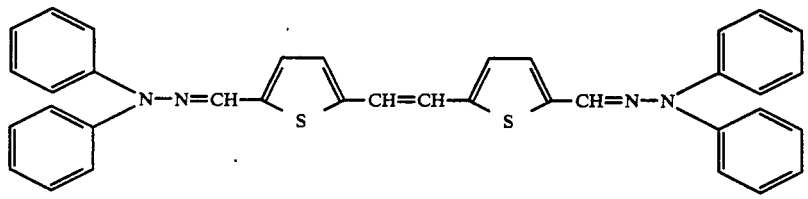
I-2
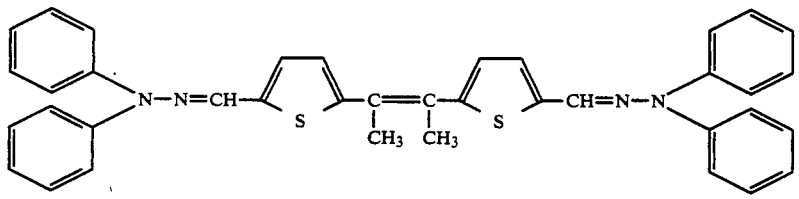
I-3
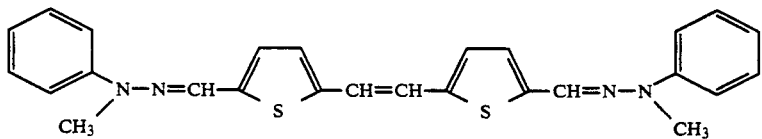
I-4
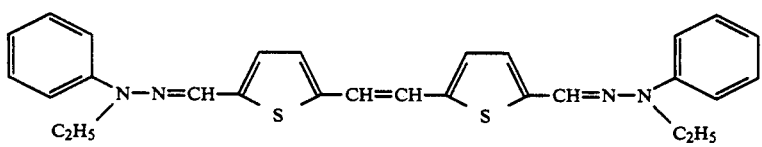
I-5
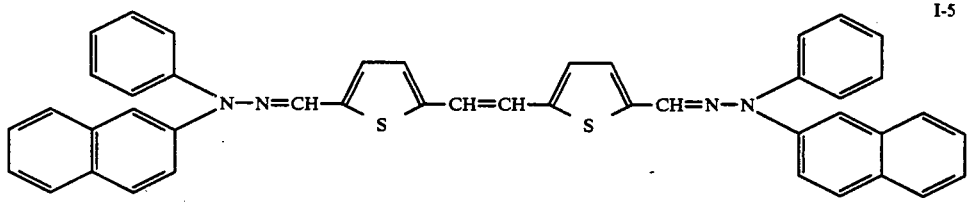
I-6
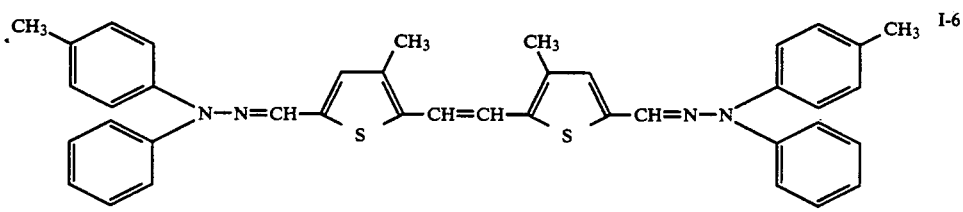

-continued
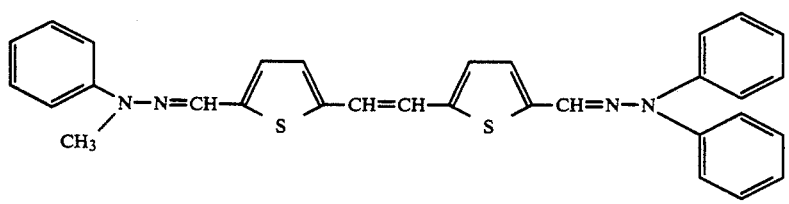
I-7
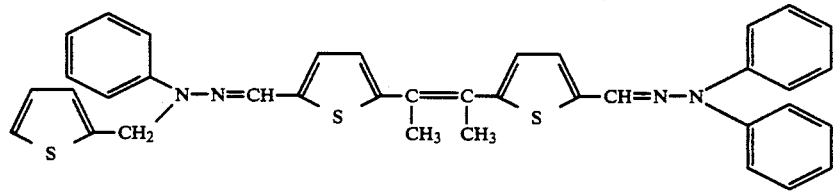
I-8
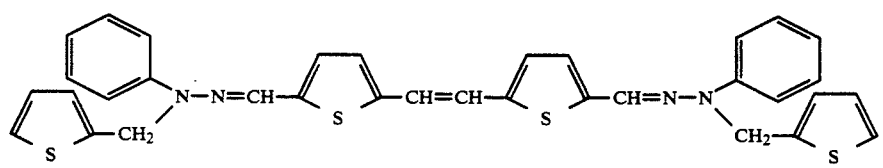
I-9
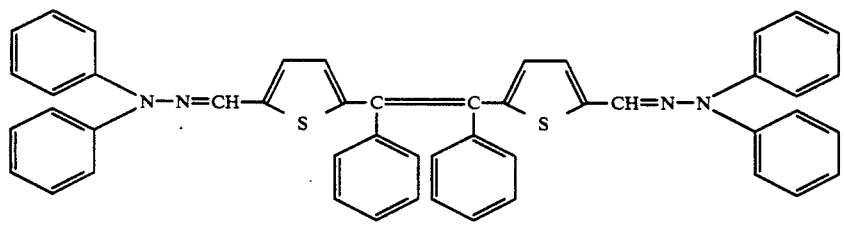
I-10
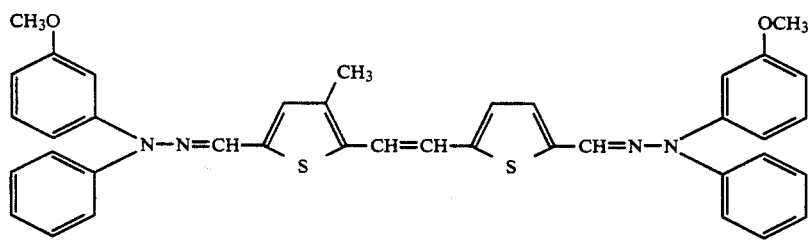
I-11
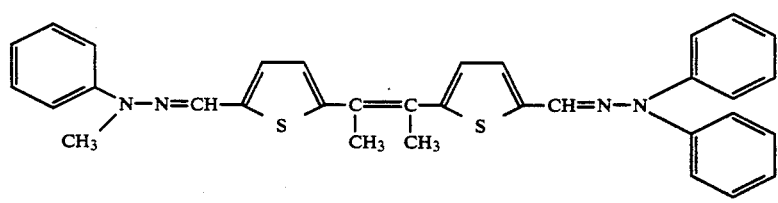
I-12
Specific examples of the hydrazone compounds of the general formula (II) prepared in the above-mentioned manner include:
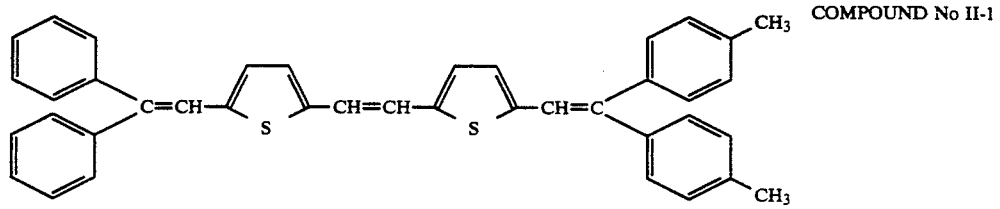
COMPOUND No II-1

-continued
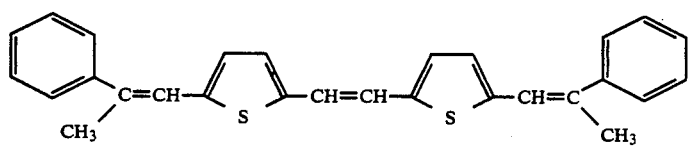 II-2
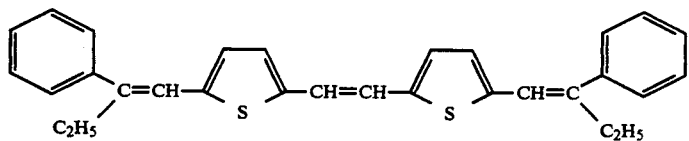 II-3
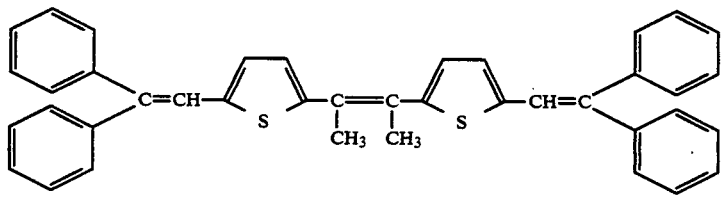 II-4
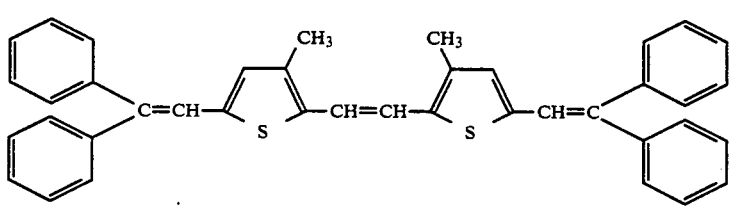 II-5
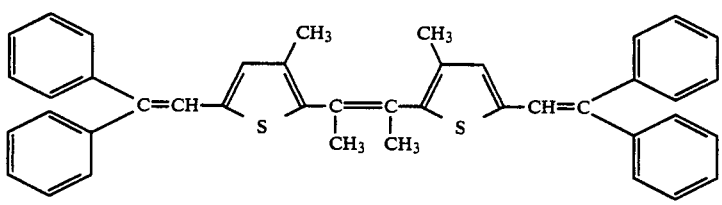 II-6
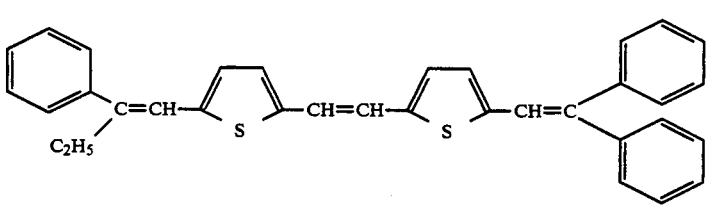 II-7
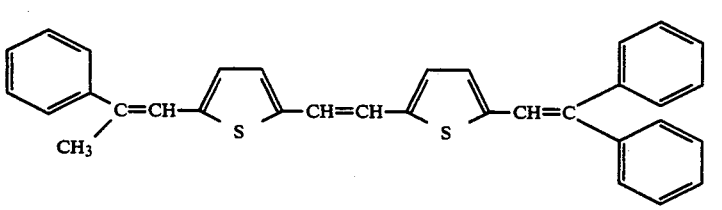 II-8
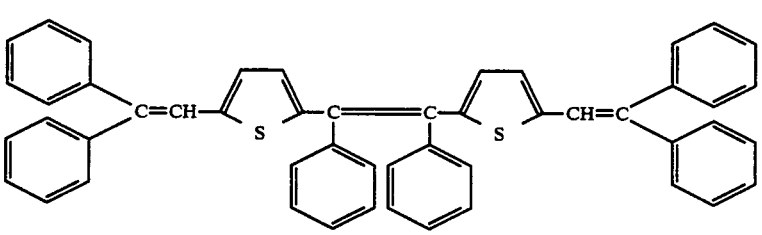 II-9

-continued

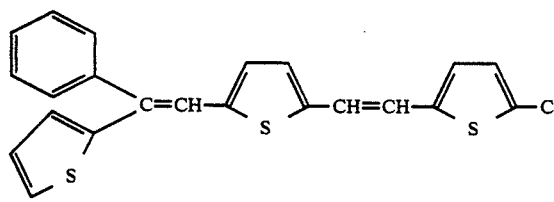
II-10

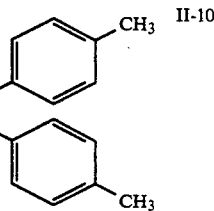

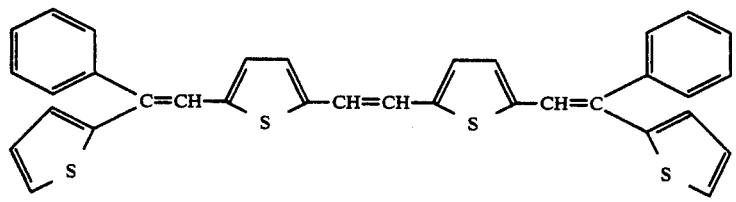
II-11

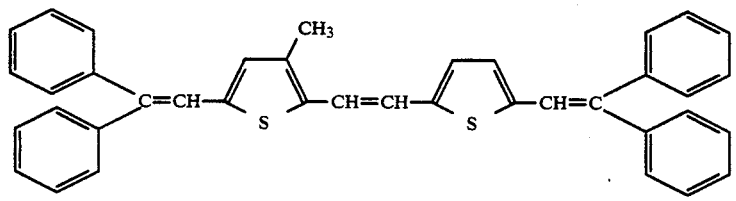
II-12

Examples will now be given, wherein various compounds represented by the general formula (I) or (II) were respectively used to produce photoconductors.

EXAMPLE 1

50 parts by weight of metal-free phthalocyanine (H₂Pc) of an X type and 100 parts by weight of the hydrazone compound No. I-1 were kneaded together with 100 parts by weight of a polyester resin (Nylon 200 (trademark), manufactured by Toyobo Co., Ltd.) and tetrahydrofuran (THF) as a solvent with a mixer for 3 hours to prepare a coating liquid. The coating liquid was applied onto an aluminum-deposited polyester film (Al-PET) as an electroconductive substrate by means of the wire bar method to form a photosensitive layer having a dry thickness of 15 μm. Thus, a photoconductor with the structure shown in FIG. 1 was produced.

EXAMPLE 2

80 parts by weight of the hydrazone compound No. I-2 and 100 parts by weight of a polycarbonate resin (Panlite L-1250 (Trademark), manufactured by Teijin Kasei Co., Ltd.) are dissolved in methylene chloride to prepare a coating liquid. The coating liquid was applied onto the aluminum-deposited polyester substrate by means of the wire bar method to form a charge transporting layer having a dry thickness of 15 μm. 50 parts by weight of titanyl phthalocyanine (TiOPc) pulverized with a ball mill for 150 hours and 50 parts by weight of polyester resin (Vylon 200) were kneaded together with THF as a solvent by a mixer for 3 hours to prepare a coating liquid. The resulting coating liquid was applied onto the foregoing charge transporting layer by the wire bar method to form a charge generating layer having a dry thickness of 1 μm.

EXAMPLE 3

A photoconductor was produced by forming a photosensitive layer in substantially the same manner as in Example 2 except that a squarylium compound represented by the following general formula:

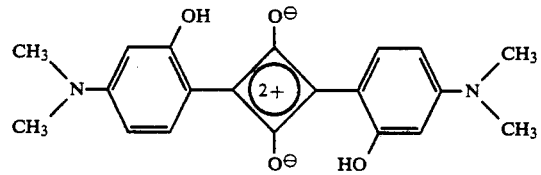

was used instead of TiOPc and the hydrazone compound No. I-3 was used as a charge transporting substance.

EXAMPLE 4

A photoconductor was produced by forming a photosensitive layer in substantially the same manner as in Example 2 except that Chlorodiane Blue which is a bisazo pigment disclosed in, for example, Japanese Patent Application Laying-Open No. 37,543/1972 was used instead of TiOPc and the hydrazone compound No. I-4 was used as a charge transporting substance.

The electrophotographic characteristics of four photoconductors thus produced were measured by using an electrostatic recording paper testing apparatus (Kawaguchi Denki Model SP-428).

The surface potential Vs(volts) of each photoconductor is an initial surface potential which was measured when the surface of each photoconductor was positively charged in the dark by corona discharge at +6.0 kV for 10 seconds. After the discontinuation of the corona discharge, each photoconductor was allowed to stand in the dark for 2 seconds, after which the surface potential Vd(volts) of each photoconductor was measured. Subsequently, the surface of each photoconductor was irradiated with white light at an illuminance of 2 luxes and the time (seconds) required for the irradiation to decrease the surface potential of each photoconductor to a half of Vd was measured, then from which the half decay exposure amount $E_{\frac{1}{2}}$ (lux.sec) was calculated. Also, the surface potential of each photoconductor after 10 seconds of irradiation thereof with white light at an illuminance of 2 luxes was measured as a residual potential Vr(volts). In addition, the characteristics of photoconductors of Examples 1 to 3 are also measured with a monochromatic light (wavelength: 780 nm) at the same time, because the high sensitivities of these photoconductors are expected in a long wavelength region. that is to say, the characteristics of each of these photoconductors are measured up to the potential Vd and subsequently the half decay exposure amounts ($\mu J/cm^2$) were obtained on irradiation with a monochromatic light having a wavelight of 780 nm instead of white light. Next, the residual potentials Vr(volts) by irradiating of a monochromatic light for 10 seconds on the surface of photoconductors were measured. The results for the measurement are shown in Table 1.

TABLE 1

| Example | White Light | | | Light with wavelength of 780 nm | | |
|---|---|---|---|---|---|---|
| | Vs (volts) | Vr (volts) | $E_{\frac{1}{2}}$ (lux.sec) | Vs (volts) | Vr (volts) | $E_{\frac{1}{2}}$ ($\mu$j.sec) |
| 1 | 780 | 60 | 2.0 | 770 | 80 | 2.2 |
| 2 | 800 | 40 | 1.8 | 760 | 30 | 1.5 |
| 3 | 770 | 30 | 1.6 | 750 | 20 | 1.4 |
| 4 | 750 | 20 | 2.0 | — | — | — |

As can be seen in Table 1, the half decay exposure amounts and the residual potentials of the photoconductors of Examples 1, 2, 3 and 4 were satisfactory, and the surface potentials showed good characteristics. It is also understood that the photoconductors of Examples 1, 2 and 3 showed high sensitivities even in a long wavelength of 780 nm and can be used for a semiconductor laser printer. In addition, when the surface potentials of the photoconductors of Examples 1 to 4 were repeated measured at 100 times, the variation of the surface potentials before exposure are 70 V or lower and the variation of the surface potentials after exposure 10 V or lower. The results on the stabilities of the photoconductors were excellent in continuous repeated use.

EXAMPLE 5

Selenium was deposited on an aluminum plate having a thickness of 500 $\mu$m by means of vacuum evaporation to form a charge generating layer having a thickness of 1.5 $\mu$m. Subsequently, 100 parts by weight of the hydrazone compound No. II-1 and 100 parts by weight of a polycarbonate resin (PCZ 200 (trademark), manufactured by Mitsubishi Gas Chemical Co., Ltd.) were dissolved in methylene chlorde to produce a coating liquid. The coating liquid was applied onto the charge generating layer by means of the wire bar method to form a charge transporting layer having a dry thickness of 20 $\mu$m. This photoconductor was charged by corona discharge at $-6.0$ kV for 10 seconds and examined with respect to electrophotographic characteristics to obtain good results, namely, Vs = $-680$ V, Vr = $-30$ and $E_{\frac{1}{2}} = 1.6$ lux.sec.

EXAMPLE 6

By the method similar to that of Example 2, 50 parts by weight of metal-free phthalocyanine of an X type and 50 parts of weight of polyvinyl chloride copolymer (MR-110 (Trademark), manufactured by Nihon Zeon Co., Ltd.) were kneaded together with methylene chloride with a mixer for 3 hours to prepare a coating liquid. The coating liquid was applied onto an aluminum substrate to form a charge generating layer having a thickness of about 1 $\mu$m. Subsequently, 100 parts by weight of the hydrazone compound No. II-2, 100 parts by weight of polycarbonate resin (Panlite L-1250) and 0.1 part by weight of silicone oil were mixed with methylene chloride to prepare a coating liquid. This coating liquid was applied onto the charge generating layer to form a charge transporting layer having a thickness of about 15 $\mu$m.

The photoconductor thus obtained was charged by corona discharge at $-6.0$ kV for 10 seconds by the method similar to that of Example 2, so that, good results were obtained, namely, Vs = $-780$ V, $E_{\frac{1}{2}} = 1.9$ lux.sec.

EXAMPLE 7

A photoconductor was produced by forming a photosensitive layer in substantially the same manner as in example 6 except that a bisazo compound represented by the following formula:

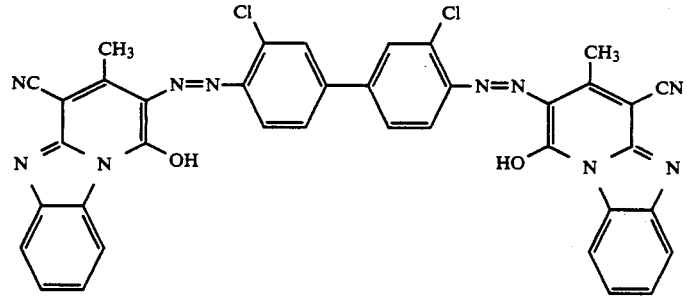

was used instead of metal-free phthalocyanine and the hydrazone compound No. II-3 was used as a charge transporting substance.

The photoconductor thus obtained was charged by corona discharge at $-6.0$ kV for 10 seconds by the method similar to that of Example 4, good results were obtained, namely, Vs = $-770$ V, $E_{\frac{1}{2}} = 1.3$ lux.sec.

EXAMPLE 8

Photoconductors were respectively produced in the same manner as in Example 4 by use of compounds No. I-5 to No. I-10 and compounds No. II-4 to No. II-12. The measuring results obtained by using the electrostatic recording paper testing apparatus Model SP-428 are shown in Table 2.

TABLE 2

| Compound No. | $E_{\frac{1}{2}}$ (lux.sec) | Compound No. | $E_{\frac{1}{2}}$ (lux.sec) |
| --- | --- | --- | --- |
| I-5 | 1.8 | II-4 | 1.7 |
| I-6 | 2.1 | II-5 | 1.5 |
| I-6 | 2.6 | II-6 | 2.2 |
| I-7 | 1.8 | II-6 | 1.9 |
| I-8 | 2.0 | II-7 | 3.0 |
| I-9 | 1.5 | II-8 | 2.0 |
| I-10 | 1.9 | II-9 | 1.8 |
| I-11 | 2.0 | II-10 | 2.5 |
| I-12 | 1.3 | II-11 | 2.3 |
|  |  | II-12 | 1.7 |

Table 2 shows the half decay exposure amounts $E_{\frac{1}{2}}$ (lux·sec) under the experimental conditions where the photoconductors were positively charged in the dark by corona discharge at 6.0 kV for 10 seconds and irradiated with white light at an illuminance of 2 luxes.

As can be seen in Table 2, the photoconductors obtained by using the hydrazone compounds No. I-5 to No. I-12 and the hydrazone compounds No. II-4 to No. II-12 as a charge transporting substance were satisfactory with respect to the half decay exposure amounts $E_{\frac{1}{2}}$.

According to the present invention, since a hydrazone compound represented by any one of the aforementioned chemical formulae (I) and (II) is used in a photosensitive layer formed on an electroconductive substrate as a charge transporting substance, a photoconductor shows a high sensitivity and excellent characteristics in repeated use when adapted to either a positive charge mode or a negative charge mode.

A suitable charge generating substance can be chosen so as to be adapted to the kind of exposure light source. By way of example, a phthalocyanine compound, a squarylium compound and a bisazo compound can be used as a charge generating substance to provide a photoconductor capable of being used in semiconductor laser printers. If necessary, a covering layer may be provided on the surface of a photoconductor to improve the durability thereof.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A photoconductor for electrophotography, comprising:
   an electroconductive substrate; and
   a photosensitive layer formed on said electroconductive substrate and comprised of a charge generating substance and a charge transporting substance, the charge transporting substance including at least one hydrazone compound represented by general formula (I):

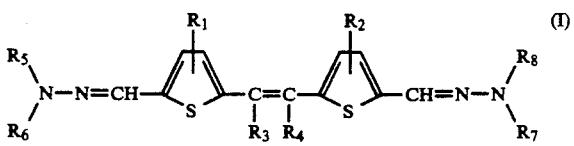

wherein each of $R_1$, $R_2$, $R_3$ and $R_4$ is selected from the group consisting of a hydrogen atom, a halogen atom, an alkyl group and an aryl group, and each of $R_5$, $R_6$, $R_7$ and $R_8$ is selected from the group consisting of an alkyl group, and a substituted or unsubstituted aryl group, aralkyl group and heterocyclic group.

2. The photoconductor as claimed in claim 1, wherein each of $R_1$, $R_2$, $R_3$ and $R_4$ is a hydrogen atom, and each of $R_5$, $R_6$, $R_7$ and $R_8$ is a phenyl group.

3. The photoconductor as claimed in claim 1, wherein each of $R_1$ and $R_2$ is a hydrogen atom, each of $R_3$ and $R_4$ is a methyl group, and each of $R_5$, $R_6$, $R_7$ and $R_8$ is a phenyl group.

4. The photoconductor as claimed in claim 1, wherein each of $R_1$, $R_2$, $R_3$ and $R_4$ is a hydrogen atom, each of $R_5$ and $R_8$ is a phenyl group, and each of $R_6$ and $R_7$ is a methyl group.

5. The photoconductor as claimed in claim 1, wherein each of $R_1$, $R_2$, $R_3$ and $R_4$ is a hydrogen atom, each of $R_5$ and $R_8$ is a phenyl group, and each of $R_6$ and $R_7$ is an ethyl group.

6. The photoconductor as claimed in claim 1, wherein said photosensitive layer comprises a laminate of a charge generating layer including said charge generating substance and a charge transporting layer includes said charge transporting substance.

7. The photoconductor as claimed in claim 6, wherein said charge transporting layer includes said charge transporting substance dispersed in a resin binder and the ratio of said charge transporting substance to said resin binder ranges from 30 to 80 percent by weight.

8. The photoconductor as claimed in claim 1, wherein said photosensitive layer comprises a layer including a dispersion of said charge generating substance and said charge transporting substance in a resin binder.

* * * * *